US012668133B2

(12) United States Patent　　　(10) Patent No.:　US 12,668,133 B2
　　Kwon　　　　　　　　　　　　　　(45) Date of Patent:　　Jun. 30, 2026

(54) CONNECTED DRIVING CONTROL METHOD FOR ADD-ON MOBILITY DEVICE AND THE ADD-ON MOBILITY DEVICE OF THE SAME

(71) Applicants:HYUNDAI MOTOR COMPANY, Seoul (KR); KIA CORPORATION, Seoul (KR)

(72) Inventor:　Gi Young Kwon, Seoul (KR)

(73) Assignees: HYUNDAI MOTOR COMPANY, Seoul (KR); KIA CORPORATION, Seoul (KR)

( * ) Notice:　Subject to any disclaimer, the term of this patent is extended or adjusted under 35 U.S.C. 154(b) by 134 days.

(21) Appl. No.: 18/527,581

(22) Filed:　Dec. 4, 2023

(65)　　　　Prior Publication Data

US 2025/0050740 A1　　Feb. 13, 2025

(30)　　Foreign Application Priority Data

Aug. 7, 2023　(KR) ........................ 10-2023-0102770

(51) Int. Cl.
　　*B60L 7/18*　　　　(2006.01)
　　*B60K 1/02*　　　　(2006.01)
　　　　　　(Continued)
(52) U.S. Cl.
　　CPC　*B60L 7/18* (2013.01); *B60K 1/02* (2013.01); *B60L 50/60* (2019.02); *B60L 53/16* (2019.02);
　　　　　　(Continued)

(58) Field of Classification Search
　　CPC .. B60L 7/18; B60L 50/60; B60L 53/16; B60L 53/57; B60L 58/18; B60L 2210/10; B60L 2240/14; B60L 2220/42; B60L 15/2009; B60L 58/20; B60K 1/02; B62D 59/04
　　　　　　(Continued)

(56)　　　　　References Cited

U.S. PATENT DOCUMENTS 6,516,925 B1 * 2/2003 Napier .................. B60T 8/1708
　　　　　　　　　　　　　　　　　　　188/112 A
2020/0377094 A1 * 12/2020 Rabbiosi ................... B60L 7/18
　　　　　　　(Continued)

*Primary Examiner* — Hitesh Patel
*Assistant Examiner* — John D Holman
(74) *Attorney, Agent, or Firm* — MCDONNELL BOEHNEN HULBERT & BERGHOFF LLP

(57)　　　　　　ABSTRACT

A mobility device connected driving control method for a first mobility device includes a plurality of first wheels, a first drive motor providing a driving force to the plurality of first wheels, a first high-voltage battery supplying power to the first drive motor, and a first pivot mechanism, and for a mobility device including a second left wheel, a second right wheel, a second drive motor providing a driving force to the second left wheel and the second right wheel, a second high-voltage battery supplying power to the second drive motor, and a second pivot mechanism mechanically connected to the first pivot mechanism. The connected driving control method includes determining whether to switch to a regenerative braking mode for the second mobility device, and in the regenerative braking mode, applying a regenerative braking torque determined according to a deceleration state of the second mobility device to the second drive motor.

16 Claims, 6 Drawing Sheets

(51) Int. Cl.

| | | |
|---|---|---|
| *B60L 50/60* | (2019.01) | |
| *B60L 53/16* | (2019.01) | |
| *B60L 53/57* | (2019.01) | |
| *B60L 58/18* | (2019.01) | |
| *B62D 59/04* | (2006.01) | |

(52) U.S. Cl.
CPC ............... *B60L 53/57* (2019.02); *B60L 58/18* (2019.02); *B60L 2210/10* (2013.01); *B60L 2240/14* (2013.01); *B62D 59/04* (2013.01)

(58) Field of Classification Search
USPC ......................................................... 701/22
See application file for complete search history.

(56)                References Cited

U.S. PATENT DOCUMENTS

| | | | |
|---|---|---|---|
| 2021/0162868 A1* | 6/2021 | Hsu ........................ | H02J 7/1423 |
| 2024/0132146 A1* | 4/2024 | Rinker ................... | B62D 5/046 |
| 2024/0270082 A1* | 8/2024 | Ghannam .............. | B60L 58/12 |
| 2025/0033482 A1* | 1/2025 | Safwat ................... | B60L 53/53 |

* cited by examiner

| Variation in deceleration | phase index | Regenerative braking torque (Nm) |
|---|---|---|
| ΔACC ≤ Δ1 | 1 | R1 |
| Δ1 < ΔACC ≤ Δ2 | 2 | R2 |
| Δ2 < ΔACC ≤ Δ3 | 3 | R3 |

FIG. 6

CONNECTED DRIVING CONTROL METHOD FOR ADD-ON MOBILITY DEVICE AND THE ADD-ON MOBILITY DEVICE OF THE SAME

CROSS REFERENCE TO RELATED APPLICATIONS

This application claims the benefit of Korean Patent Application No. 10-2023-0102770, filed on Aug. 7, 2023, which is hereby incorporated by reference as if fully set forth herein.

BACKGROUND

Technical Field

The present disclosure relates to an add-on mobility device configured to selectively supply power to a front mobility device.

Discussion of the Related Art

It is known that an electric vehicle is driven with its wheels driven by a driving force of a drive motor.

It is also known that a high-voltage battery is fixedly mounted on the vehicle to supply power to the drive motor.

The drive motor may be an alternating current (AC) motor and may thus include an inverter between the battery and the drive motor.

When the battery of the electric vehicle requires charging according to its state of charge, i.e., SOC, it may be charged by receiving external power through an on-board charger (OBC).

In this case, charging time may be determined depending on a charging method, which is broadly divided into slow charging and fast charging.

Recent unremitted research and development on batteries have greatly improved a driving range per charge.

However, a battery fixedly mounted on an electric vehicle alone may still be insufficient, and an alternative is therefore required.

SUMMARY

To solve the technical issues described above, an object of the present disclosure is to provide the following.

The object of the present disclosure is to provide a technology of a new concept using, in addition to a battery (hereinafter a "main battery" for the convenience of description) installed in an electric vehicle, a battery (hereinafter a "replaceable battery" to distinguish it from the main battery) added to or removed from a power system of the electric vehicle as needed.

The object of the present disclosure is to additionally provide a technology for effectively executing, by an add-on mobility device, regenerative braking depending on its deceleration state, when a replaceable battery is installed and provided in the add-on mobility device.

According to an aspect of the present disclosure, there is provided a connected driving control method of controlling connected driving of a first mobility device and a second mobility device, the first mobility device including a plurality of first wheels, at least one first drive motor providing a driving force to the plurality of first wheels, a first high-voltage battery supplying power to the at least one first drive motor, and a first pivot mechanism, and the second mobility device including a second left wheel, a second right wheel, at least one second drive motor providing a driving force to the second left wheel and the second right wheel, a second high-voltage battery supplying power to the at least one second drive motor, and a second pivot mechanism mechanically connected to the first pivot mechanism, the connected driving control method, including determining whether to switch to a regenerative braking mode for the second mobility device, and in the regenerative braking mode, applying a regenerative braking torque determined according to a deceleration state of the second mobility device to the at least one second drive motor.

The first mobility device may further include, a first controller, at least one electric device that operates at a low voltage, a low-voltage battery that supplies power to the at least one electric device, a first direct current (DC) to DC (DC/DC) converter connected between the first high-voltage battery and the low-voltage battery, a second DC/DC converter connected to the first high-voltage battery, and a first connector connected to the second DC/DC converter, wherein the first controller may be configured to control the second DC/DC converter according to a state of the first high-voltage battery and a state of the second high-voltage battery to charge the first high-voltage battery with the power of the second high-voltage battery, and the second mobility device may further include a third connector electrically and removably connected to the first connector and connected to the second high-voltage battery.

The determining of whether to switch to the regenerative braking mode may include receiving a brake signal of the first mobility device to perform the determining.

The determining of whether to switch to the regenerative braking mode may further include receiving an acceleration sensor signal of the second mobility device to perform the determining.

The determining of whether to switch to the regenerative braking mode may further include when it is determined that the first mobility device is in a braking state from the brake signal and the second mobility device is in the deceleration state from the acceleration sensor signal, determining to switch to the regenerative braking mode.

The deceleration state may include a plurality of phases, wherein the regenerative braking torque may be determined according to each of the plurality of phases.

The plurality of phases may be divided by a set deceleration rate.

The at least one second drive motor may include: a second left drive motor that provides a driving force to the second left wheel and a second right drive motor that provides a driving force to the second right wheel.

According to an aspect of the present disclosure, there is provided an add-on mobility device, mechanically connected to and capable of traveling together with, a front mobility device which comprises a plurality of first wheels, at least one first drive motor providing a driving force to the plurality of first wheels, a first high-voltage battery supplying power to the at least one first drive motor, a first controller controlling the first drive motor, and a first pivot mechanism, the add-on mobility device comprising a frame including a second pivot mechanism mechanically connected to the first pivot mechanism, a second left wheel installed on a left side of the frame, a second right wheel installed on a right side of the frame, at least one second drive motor that provides a driving force to the left wheel and the right wheel, a second high-voltage battery that supplies power to the second drive motor; and a second controller configured to control the second drive motor, wherein the second controller may include, a non-transitory storage medium storing a computer program for driving control for the add-on mobility device, and a processor configured to execute the computer program, wherein the driving control may include determining whether to switch to a regenerative braking mode for the add-on mobility device; and in the regenerative braking mode, applying a regenerative braking torque determined according to a deceleration state of the add-on mobility device to the at least one second drive motor.

The front mobility device may further include at least one electric device that operates at a low voltage, a low-voltage battery that supplies power to the at least one electric device, a first DC/DC converter connected between the first high-voltage battery and the low-voltage battery, a second DC/DC converter connected to the first high-voltage battery, and a first connector connected to the second DC/DC converter, wherein the first controller may be configured to: control the second DC/DC converter according to a state of the first high-voltage battery and a state of the second high-voltage battery to charge the first high-voltage battery with the power of the second high-voltage battery, and the add-on mobility device may further include a third connector electrically and removably connected to the first connector and connected to the second high-voltage battery.

The determining of whether to switch to the regenerative braking mode may include receiving a brake signal of the front mobility device to perform the determining.

The determining of whether to switch to the regenerative braking mode may further include receiving an acceleration sensor signal of the add-on mobility device to perform the determining.

The determining of whether to switch to the regenerative braking mode may further include when it is determined that the front mobility device is in a braking state from the brake signal and the add-on mobility device is in the deceleration state from the acceleration sensor signal, determining to switch the regenerative braking mode.

The deceleration state may include a plurality of phases, wherein the regenerative braking torque may be determined according to each of the plurality of phases.

The plurality of phases may be divided by a set deceleration rate.

The at least one second drive motor may include a second left drive motor that provides a driving force to the second left wheel and a second right drive motor that provides a driving force to the second right wheel.

According to embodiments of the present disclosure described herein, there is provided a replaceable battery that is added to or separated from a power system of an electric vehicle through an add-on mobility device.

In addition, this may enable the effective execution of regenerative braking according to a deceleration state in the add-on mobility device.

BRIEF DESCRIPTION OF THE FIGURES

FIGS. 5 and 6 are diagrams illustrating a phase and a regenerative braking torque for each deceleration state according to an embodiment of the present disclosure.

DETAILED DESCRIPTION

Figure 1:
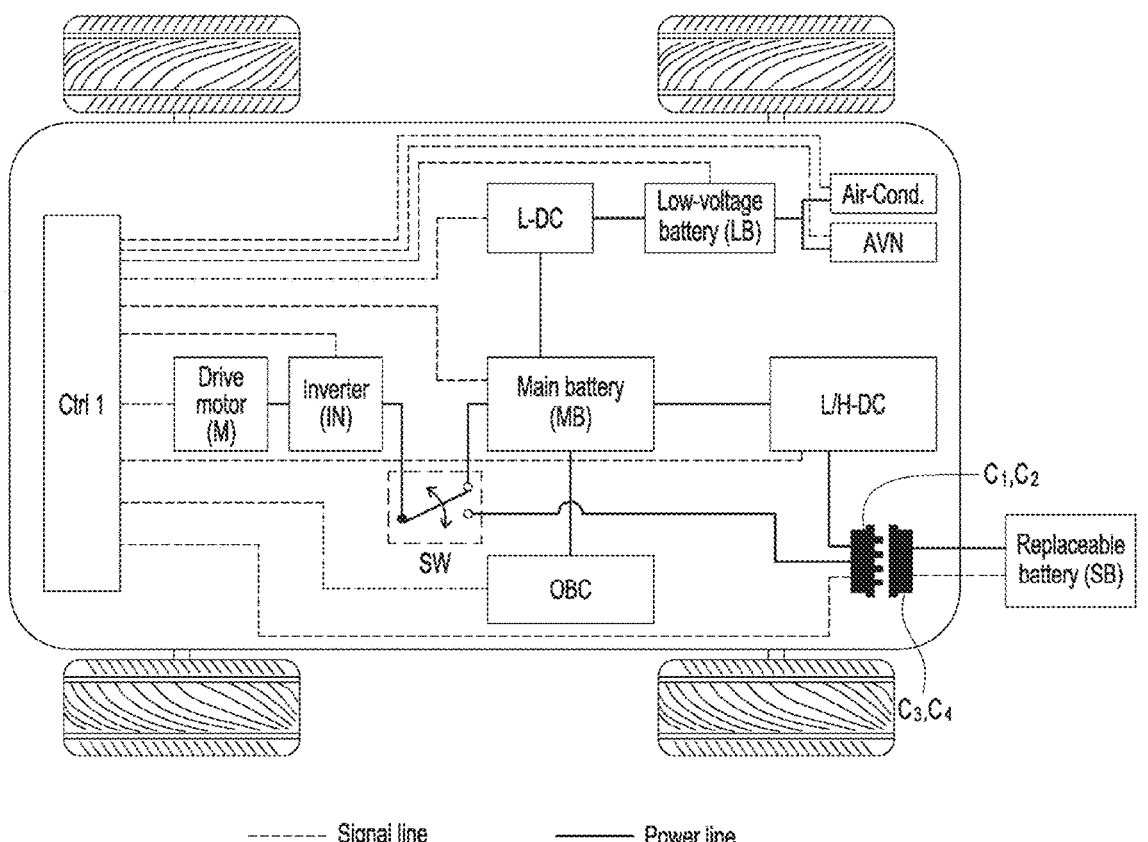
FIG. 1 is a diagram illustrating a power system of a first mobility device (e.g., an electric vehicle) according to an embodiment of the present disclosure.

Hereinafter, embodiments of the present disclosure will be described in detail with reference to the accompanying drawings, and the same or similar elements will be given the same reference numerals regardless of reference symbols, and repeated description thereof will be omitted.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation.

Although terms including ordinal numbers, such as "first," "second," and the like, may be used herein to describe various elements, the elements are not limited by these terms. These terms are only used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

The singular forms "a," "an," and "the" are intended to include the plural forms as well, unless the context clearly indicates otherwise. It is to be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit" or "control unit" is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are necessary for controlling a function assigned thereto.

Meanwhile, a processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), and an electronic circuit (e.g., circuitry and logic circuits).

In addition, computer-readable recording media (or simply memory) include all types of storage devices that store data readable by a computer system. The storage devices may include at least one type of, for example, flash memory, hard disk, micro-type memory, card-type (e.g., secure digital (SD) card or extreme digital (XD) card) memory, random-access memory (RAM), static RAM (SRAM), read-only memory (ROM), programmable ROM (PROM), electrically erasable PROM (EEPROM), magnetic RAM (MRAM), magnetic disk, or optical disc.

This recording medium may be electrically connected to the processor, and the processor may load and record data from the recording medium. The recording medium and the processor may be integrated or may be physically separated.

Hereinafter, the accompanying drawings will be briefly described, and embodiments of the present disclosure will be described in detail with reference to the accompanying drawings.

Figure 2:
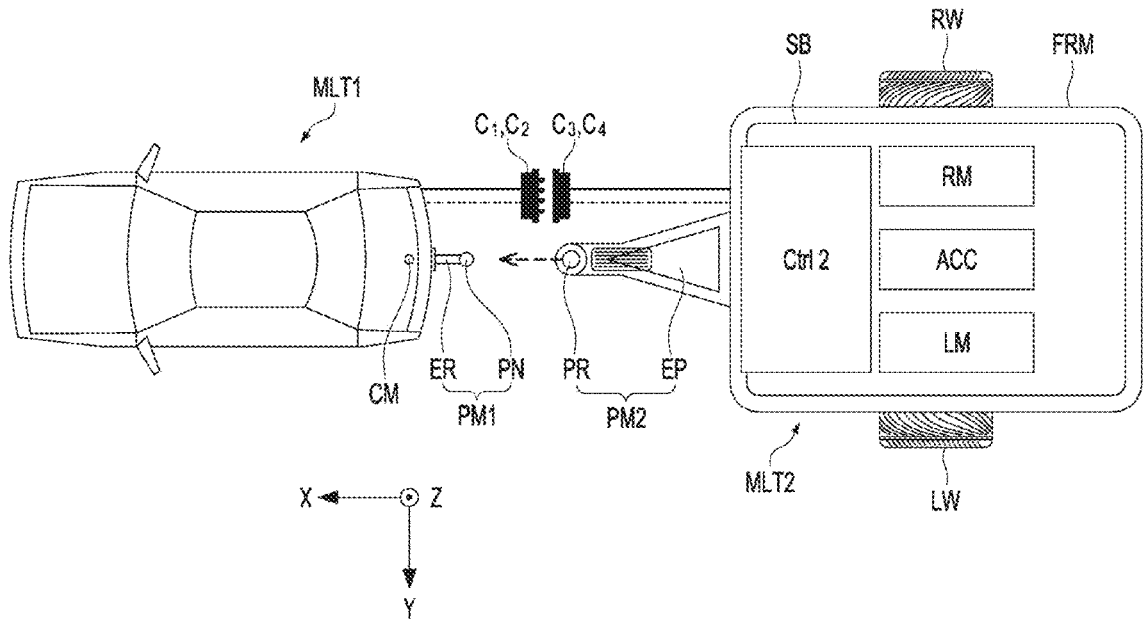
FIG. 2 is a diagram illustrating a connection between a first mobility device and a second mobility device according to an embodiment of the present disclosure.

FIG. 1 conceptually shows a power system of a first mobility device MLT1 (e.g., an electric vehicle) according to an embodiment of the present disclosure, and FIG. 2 shows a second mobility device MLT2 connected to the first mobility device MLT1. The first mobility device MLT1 may be referred to herein as a front mobility device, and the second mobility device MLT2 may be referred to herein as an add-on mobility device.

Respective structures of the first mobility device MLT1 and the second mobility device MLT2 will be described hereinafter with reference to FIGS. 1 and 2.

As shown in FIG. 1, according to an embodiment of the present disclosure, the first mobility device MLT1 may be, for example, an electric vehicle, and include a first drive motor M, an inverter IN, a main battery MB, and an on-board charger (OBC), a first direct current (DC) to DC (DC/DC) converter L-DC, a low-voltage battery LB, an air conditioning unit Air-cond and an audio video navigation (AVN) that operate at a low voltage, a second DC/DC converter L/H-DC, a switch SW, and a controller (hereinafter, a first controller).

The first drive motor M may provide a driving force to the wheels of the vehicle and may be, for example, an alternating current (AC) motor.

The inverter IN may convert DC power supplied to the first drive motor M into AC.

The main battery MB (e.g., a first high-voltage battery) may be a high-voltage battery and may be fixedly installed in the vehicle, for example, under a cabin floor.

The main function of the main battery MB is to supply electric power to the first drive motor M and may be charged with the OBC.

Additionally, the main battery MB may be connected to the low-voltage battery LB through the first DC/DC converter L-DC to charge the low-voltage battery LB.

For charging the low-voltage battery LB, the first DC/DC converter L-DC may be a step-down lower DC/DC converter (LDC).

The low-voltage battery LB may be, for example, a 12V or 24V battery, and may supply electric power to electrical devices in the vehicle, such as the air conditioning unit or the AVN that operates at a low voltage.

A replaceable battery SB (e.g., a second high-voltage battery) shown in FIG. 1 may be a high-voltage battery and may be installed in the second mobility device MLT2 to be described below.

The replaceable battery SB may be electrically connected to a power system of the vehicle including the main battery MB in an auxiliary way, that is, in a way that it is separable without having any effect on the operation (e.g., supplying power to electronic parts, the drive motor, and the like of the vehicle) of the power system, in a wired manner (or a wireless manner within the possible range).

The replaceable battery SB may also be referred to as an auxiliary battery, an extended battery, and a second or secondary battery, but this is only to distinguish it from the main battery MB. That is, however, by its name, the replaceable battery SB may not be limited in its functions, features, mechanical/electrical/chemical structures of its own or based on a relationship with other objects (including the main battery MB, a host vehicle, etc.), a battery type (including a packaging type, anode/cathode/separator material, etc.), a charging method, and the like.

The replaceable battery SB may be communicatively connected, in a wired or wireless manner, to a first controller Ctrl1 of the first mobility device MLT1 which is a host vehicle, or to a battery management system (BMS) of the main battery MB described below. Through this, various sensing information (e.g., voltage, current, temperature, etc.) associated with a state of charge (SOC) and a physical/electrical/chemical state of the replaceable battery SB may be transmitted to the first controller Ctrl1. However, examples are not necessarily limited thereto, and such information associated with the replaceable battery SB may be transmitted to the first controller Ctrl1 through the second controller Ctrl2 of the second mobility device MLT2 to be described below.

In this embodiment, the high-voltage battery applied to the main battery MB and the replaceable battery SB may include a plurality of battery cells (not shown) that output a unit voltage within, for example, 2.7V to 4.2V, and the plurality of battery cells, which is provided as a set number of battery cells, may be connected in series/parallel to each other to form one module. The high-voltage battery may be packaged in one battery package with one or more battery modules being connected in series/parallel to output a desired output voltage, for example, approximately 400V, 800V, or several kV.

The high-voltage battery of the main battery MB and the replaceable battery SB may include a BMS.

The BMS may include a battery management unit (BMU), a cell monitoring unit (CMU), and a battery junction box (BJB).

The BMS may perform a cell balancing function to maintain the voltage of each cell to be constant and ensure the performance of the entire battery pack, an SOC function to calculate the capacity of the entire battery system, and battery cooling, charging, and discharging control functions.

The BMU may perform the functions of the BMS by receiving information about all the cells from the CMU.

For example, the BMU may include two micro control units (MCUs), and each of the MCUs may have one controller area network (CAN) communication port. It may also include a CAN interface for communicating with a vehicle controller which may be an upper device of the BMS, and a CAN interface for collecting information from the CMU which may be a lower device of the BMS.

The CMU may be attached directly to a battery cell to sense voltage, current, and temperature. The CMU may perform simply sensing without performing calculations related to a BMS algorithm. For example, a single CMU may be connected to multiple battery cells and may transmit information of each cell to the BMU through the CAN interface.

The BJB may be a pack-level sensing mechanism of the BMS and a connection medium between the high-voltage battery and a drive system. It may measure and record a battery voltage and current flowing into and out of the battery to accurately calculate an SOC. The BJB may also perform safety-critical functions such as contactor and insulation monitoring, in addition to overcurrent detection.

The replaceable battery SB may be a high-voltage battery with a lower voltage than that of the main battery MB, and in this case, the second DC/DC converter L/H-DC may be a step-up DC/DC converter. Also, on the contrary, the replaceable battery SB may be a high-voltage battery with a higher voltage than that of the main battery MB, and in this case, the second DC/DC converter L/H-DC may be a step-down DC/DC converter.

In this embodiment, the second DC/DC converter L/H-DC may be included as a built-in component in the first mobility device MLT1 in the power system, but is not limited thereto. For example, unlike this embodiment, the second DC/DC converter L/H-DC may be provided as a separate component and may be additionally and removably connected to the power system.

In this embodiment, for the removable electrical connection of the replaceable battery SB to the power system, the power system of the first mobility device MLT1 may include a first connector C1 and a second connector C2, and the replaceable battery SB may include a third connector C3 and a fourth connector C4.

For example, the first and second connectors C1 and C2 may be an integrated connector, and the third and fourth connectors C3 and C4 may also be an integrated connector.

The first connector C1 may be connected to the second DC/DC converter L/H-DC, and the second connector C2 may be connected to the switch SW.

Although not shown, it may also be possible that a signal transfer connector may be added to transmit various sensing and state information of the replaceable battery SB to the controller.

The switch SW may be fixedly and electrically connected to the inverter IN, and may be switched between the main battery MB and the second connector C2 to electrically connect the inverter IN and the main battery MB or to electrically connect the inverter IN and the replaceable battery SB.

In this embodiment, the first controller Ctrl1 may be an uppermost vehicle controller that controls all the electric devices of the first mobility device MLT1 but is not necessarily limited thereto. That is, for example, the first controller Ctrl1 of FIG. 1 may be a power controller lower than the vehicle controller.

In addition, as described above, the first controller Ctrl1 may include a computer-readable recording medium that stores an operating system (OS), logic commands, input/output information, and the like, and at least one processor that reads them to perform at least one of selection, calculation, and determination necessary for controlling a corresponding function.

In addition, in this embodiment, the main battery MB may be connected to the inverter IN through the switch SW but is not necessarily limited thereto, and the main battery MB may be connected directly to the inverter IN without the switch SW. In this case, the second connector and the fourth connector of the replaceable battery SB may not be required.

The replaceable battery SB shown in FIG. 1 may be installed in the second mobility device MLT2, as shown in FIG. 2.

The second mobility device MLT2 may include a frame FRM, a second left wheel LW installed on the left side of the frame FRM, a second right wheel RW installed on the right side of the frame FRM, a second left drive motor LM that provides a driving force to the second left wheel LW, a second right drive motor RM that provides a driving force to the second right wheel RW, and a second controller Ctrl2.

The replaceable battery SB may be fixedly installed in the second mobility device MLT2 but is not necessarily limited thereto. That is, the replaceable battery SB may be removably installed in the second mobility device MLT2. This may allow the replaceable battery SB with an SOC, when mounted on the frame FRM, is in a fully discharged state to be removed and replaced with a new replaceable battery SB whose SOC is in a fully charged state.

When the replaceable battery SB is fixedly installed in the second mobility device MLT2, the second mobility device MLT2 may include a charging connector for charging the replaceable battery SB.

The frame FRM may form the exterior of the second mobility device MLT2 and serve to accommodate other components.

The frame FRM may include a second pivot mechanism PM2, and the second pivot mechanism PM2 may be separably and pivotably connected to a first pivot mechanism PM1 fixed to a vehicle body of the first mobility device MLT1.

For example, the first pivot mechanism PM1 may include an extension rod ER extending backward from the vehicle body of the first mobility device MLT1 and a pivot pin PN protruding upward from an end of the extension rod ER.

In addition, the second pivot mechanism PM2 may include a triangular extension part EP protruding forward from the frame FRM of the second mobility device MLT2 and a pivot ring PR that allows the pivot pin PN to be rotatably inserted at an end of the extension part EP.

The pivot pin PN may be limited in its linear movement while inserted in the pivot ring PR, but may rotate only about a Z-axis direction shown in FIG. 2. Therefore, in such a pivot-connected state, the second mobility device MLT2 may be restricted from a linear movement about a pivot connection point with respect to the first mobility device MLT1 and may only rotate about a Z axis.

When driving in a forward direction, i.e., in an X-axis direction, the first mobility device MLT1 and the second mobility device MLT2 may maintain their straightness without requiring separate steering control of the second mobility device MLT2.

A rotation axis of the second left drive motor LM may be connected to the second left wheel LW, which may allow the second left drive motor LM to provide a driving force to the second left wheel LW.

In addition, a rotation axis of the second right drive motor RM may be connected to the second right wheel RW, which may allow the second right drive motor RM to provide a driving force to the second right wheel RW.

Since the second left wheel LW and the second right wheel RW are respectively connected to the second left drive motor LM and the second right drive motor RM, they may be driven independently.

The second left drive motor LM and the second right drive motor RM may be driven in the forward and reverse directions, respectively. When driven in the forward direction, the second mobility device MLT2 may travel forward, and when driven in the reverse direction, the second mobility device MLT2 may travel backward.

For example, the second left drive motor LM and the second right drive motor RM may each be implemented as an in-wheel drive system in which respective drive motors are installed within the wheels, but examples are not necessarily limited thereto.

In addition, unlike this embodiment, the left and right sides of the second mobility device MLT2 are not driven independently, but the power of one common motor may be transmitted to the second left wheel LW and the second right wheel RW by being divided and distributed thereto. To this end, a differential gear may be included between a common motor and the second left wheel LW and the second right wheel RW. That is, the power of the common motor may be distributed by the differential gear and transmitted to the second left wheel LW and the second right wheel RW.

As shown in FIG. 2, the second controller Ctrl2 may control the second left drive motor LM and the second right drive motor RM to enable forward and backward driving of the second mobility device MLT2. In addition, the second controller Ctrl2 may change a traveling (or driving) direction of the second mobility device MLT2 by controlling the torque or rotation count of the second left drive motor LM and the second right drive motor RM. That is, controlling the driving of the second left drive motor LM and the second right drive motor RM independently may enable steering of the second mobility device MLT2 without a separate steering device.

In addition, as described above, a wired or wireless communication means for transferring information between the connectors of FIG. 1 and the first mobility device MLT1 and the second mobility device MLT2 may be included.

In this embodiment, the first controller Ctrl1 or the second controller Ctrl2 may include a memory and a processor. The memory may store computer instructions for performing functions of the corresponding controllers, and the processor may perform the foregoing functions by loading the instructions from the memory and executing them.

The memory may include at least one of, for example, a hard disk drive (HDD), a solid-state drive (SDD), a silicon disk drive (SDD), read-only memory (ROM), random-access memory (RAM), compact disc ROM (CD-ROM), a magnetic tape, a floppy disk, and an optical data storage device.

In addition, the processor may include at least one of, for example, a computer, a microprocessor, a central processing unit (CPU), an application-specific integrated circuit (ASIC), an electric circuit, and a logic circuit.

As the first connector C1 and the second connector C2 of the first mobility device MLT1 and the third connector C3 and the fourth connector C4 of the second mobility device MLT2 are connected, and the signal transfer connector is connected, the first mobility device MLT1 and the second mobility device MLT2, that is, the first controller Ctrl1 and the second controller Ctrl2, may enter a state in which they communicate with each other.

When the first mobility device MLT1 starts traveling forward, while the first mobility device MLT1 and the second mobility device MLT2 are in mechanical and electrical connection, the second controller Ctrl2 may control the second left drive motor LM and the second right drive motor RM according to a driving speed based on a signal transmitted from the first connector C1 to allow the second mobility device MLT2 to perform forward straight driving.

In this case, some or all of the speed, gear position, steering angle, accelerator pedal sensor (APS) information, and brake pedal sensor (BPS) information of the first mobility device MLT1 may be transmitted to the second mobility device MLT2.

For example, the second controller Ctrl2 of the second mobility device MLT2 may use some or all of the speed, gear position, APS information, and BPS information of the first mobility device MLT1 to determine whether the first mobility device MLT1 is in a forward driving state or a backward driving state. However, examples are not limited thereto, and the second controller Ctrl2 of the second mobility device MLT2 may receive information as to whether the first mobility device MLT1 is in the forward driving state or the backward driving state directly from the first controller Ctrl1.

When the first mobility device MLT1 is traveling forward, the second controller Ctrl2 may drive the second left drive motor LM and the second right drive motor RM in the forward direction to allow the second mobility device MLT2 to perform forward straight driving. In addition, when the first mobility device MLT1 is traveling backward, the second controller Ctrl2 may drive the second left drive motor LM and the second right drive motor RM in the reverse direction to allow the second mobility device MLT2 to perform backward driving.

In addition, the second controller Ctrl2 may determine a steering state based on steering angle information of the first mobility device MLT1 and may thus perform steering of the second mobility device MLT2 accordingly.

The second mobility device MLT2 may not include a separate steering device such as a steering wheel, a steering rack, and the like, but may perform the steering through torque control for the second left drive motor LM and the second right drive motor RM.

That is, the second controller Ctrl2 may calculate a driving torque for driving and a steering torque for steering for each of the second left drive motor LM and the second right drive motor RM and use the calculated torque for control.

For example, to achieve the steering of the second mobility device MLT2, steering torque values of the second left drive motor LM and the second right drive motor RM according to steering angles of the first mobility device MLT1 may be included in a lookup table or calculation program.

During the forward straight driving, the speed of the second mobility device MLT2 may be controlled not to be greater than that of the first mobility device MLT1. Thus, the pivot connection between the first mobility device MLT1 and the second mobility device MLT2 may be maintained within a predetermined pivot angle range. For example, when the speed of the second mobility device MLT2 is controlled not to be greater than that of the first mobility device MLT1 during the forward straight driving, a pivot angle of the second mobility device MLT2 with respect to the first mobility device MLT1 at a pivot connection point may be maintained at 0 degrees (°) (i.e., an angle at which the first mobility device MLT1 and the second mobility device MLT2 are in a straight line).

During the forward driving, the second mobility device MLT2 may be controlled to follow the first mobility device MLT1, which may enable smooth connected driving of multiple mobility devices.

In addition, the second mobility device MLT2 may include a regenerative braking system.

During braking, a regenerative braking torque may be applied to the second left drive motor LM and the second right drive motor RM, and electricity generated therefrom may be stored in the replaceable battery SB. In this case, it is obvious that, when the common motor is used, instead of independent left and right driving as described above, the regenerative braking torque is applied and enables regenerative braking.

The regenerative braking system is already well known, and a more detailed description thereof including its necessary components and configuration will thus be omitted here.

The second mobility device MLT2 may also include an acceleration sensor ACC.

The second controller Ctrl2 may determine acceleration and deceleration of the second mobility device MLT2 using a signal received from the acceleration sensor ACC.

Figure 3:
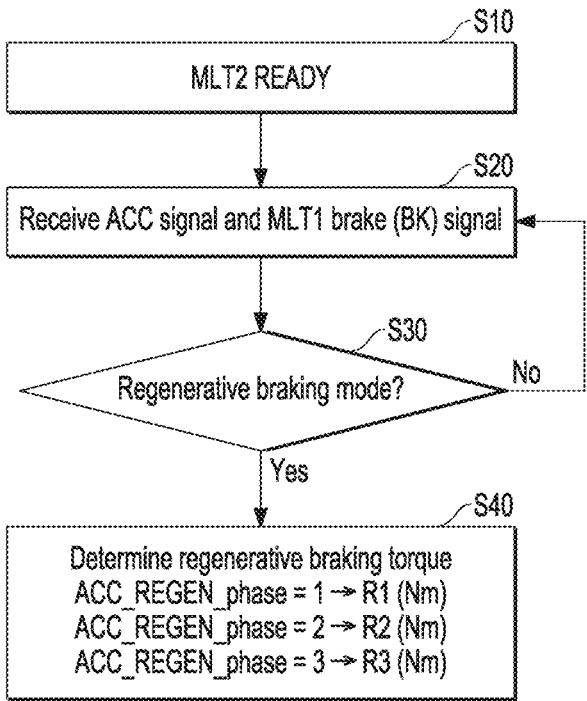
FIG. 3 is a flowchart illustrating a connected driving control method according to an embodiment of the present disclosure.

FIG. 3 is a flowchart illustrating a connected driving method for the first mobility device MLT1 and the second mobility device MLT2.

FIG. 3 shows, in particular, a control method for executing regenerative braking in the second mobility device MLT2.

Referring to FIG. 3, step S10 indicates a driving standby state of the second mobility device MLT2.

That is, in a similar way that an electric vehicle has an "EV Ready" state, the driving standby state may indicate a "Ready" state of the second mobility device MLT2.

For example, in the "Ready" state, the second mobility device MLT2 may receive sensing information from various sensors and necessary information from the first mobility device MLT1 to monitor a system state, and may travel at any time using the second left drive motor LM and the second right drive motor RM.

When the second controller Ctrl2 determines that the first mobility device MLT1 is traveling forward through the information received from the first mobility device MLT1, as described above, the second controller Ctrl2 may apply a driving torque to the second left drive motor LM and the second right drive motor RM to drive the second mobility device MLT2.

In step S20, the second controller Ctrl2 may receive an acceleration signal from the acceleration sensor ACC and a brake signal from the first mobility device MLT1.

The first controller Ctrl1 may transmit the brake signal to the second controller Ctrl2 as a brake pedal of the first mobility device MLT1 is pressed.

For example, the brake signal may be an on signal in a braking state, and an off signal in a non-braking state.

In step S30, the second controller Ctrl2 may determine whether to switch to a regenerative braking mode through the acceleration signal and the brake signal.

Figure 4:
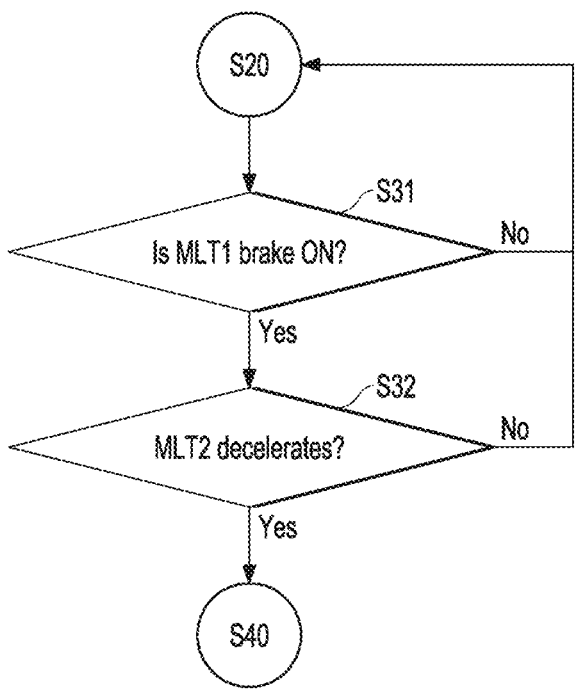
FIG. 4 is a flowchart illustrating a detailed example of a step S30 of FIG. 3.

For example, as shown in FIG. 4, step S30 may include step S31 of determining the brake signal of the first mobility device MLT1 and step S32 of performing the determination based on the acceleration sensor ACC signal.

That is, as shown in FIG. 4, when the brake signal is the on signal (Yes in S31) and the acceleration sensor ACC signal indicates deceleration (Yes in S32), the second controller Ctrl2 may switch to the regenerative braking mode. In this case, whether there is deceleration may be determined based on whether the acceleration sensor ACC signal is greater than or equal to a set deceleration value.

It may also be possible to determine the switch to the regenerative braking mode through only one of step S31 of determining the brake signal of the first mobility device MLT1 and step S32 of determining the acceleration sensor ACC signal.

Referring back to FIG. 3, in step S40, when the switch to the regenerative braking mode is determined, the second controller Ctrl2 may determine a regenerative braking torque based on a deceleration state of the second mobility device MLT2.

The deceleration state may be divided into a plurality of phases, and the regenerative braking torque may be predetermined according to each phase.

The regenerative braking torque determined as such may be divided in half and applied to the second left drive motor LM and the second right drive motor RM. It may also be possible that, when one common drive motor is used, all the determined regenerative braking torque is applied to the common drive motor.

Hereinafter, an example of determining a regenerative braking torque according to each phase in a deceleration state will be described in detail with reference to FIGS. 5 and 6.

Figure 5:
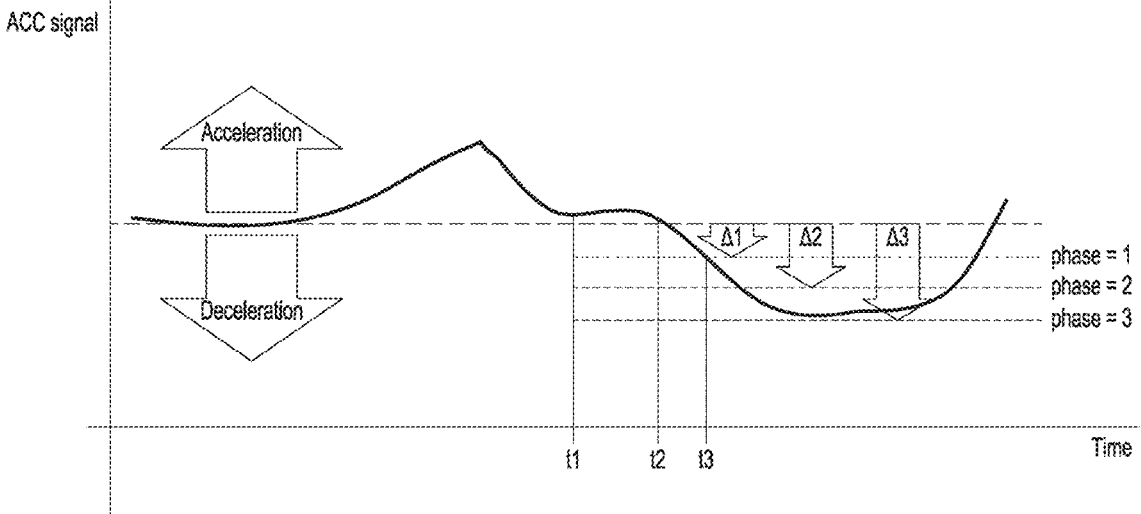

FIG. 5 shows an acceleration sensor ACC shown over time while the second mobility device MLT2 is driving, and FIG. 6 shows a regenerative braking torque predetermined for each pace.

As shown in FIG. 5, an acceleration interval may indicate an interval in which the second controller Ctrl2 controls the second left drive motor LM and the second right drive motor RM to accelerate the second mobility device MLT2, as the first mobility device MLT1 accelerates.

When the second mobility device MLT2 decelerates while driving, a pace may be determined according to such a deceleration state, which will be described in detail below.

As shown in FIG. 5, at a first time point t1, a brake signal of the first mobility device MLT1 may be on but the acceleration sensor ACC may not be in a deceleration state. Accordingly, at the first time point t1, a switch to the regenerative braking mode may not be determined.

However, at a second time point t2, the brake signal of the first mobility device MLT1 may be on and the acceleration signal may be in a state in which the acceleration signal is greater than or equal to a set deceleration value, and the second controller Ctrl2 may determine the switch to the regenerative braking mode.

In determining a phase in the deceleration state, when the deceleration is less than or equal to a first set deceleration value Δ1, the phase may be determined to be phase 1, and when the deceleration exceeds the first set deceleration value Δ1 and is less than or equal to a second set deceleration value Δ2, the phase may be determined to be phase 2. When the deceleration progresses further and exceeds the second set deceleration value Δ2 and is less than or equal to a third set deceleration value Δ3, the phase may be determined to be phase 3.

In addition, as the phase of the deceleration state is determined, the regenerative braking torque may be determined differently. That is, as shown in FIG. 6, the regenerative braking torque may be determined to be R1 in phase 1, R2 in phase 2, and R3 in phase 3.

As shown in FIG. 5, the deceleration may increase further at a third time point t3, the phase may be switched from phase 1 to phase 2, but in this case, when it is assumed that the deceleration decreases again to be less than or equal to the first set deceleration value Δ), the phase of the deceleration state at the third time point t3 may remain at phase 1.

As described above, when the regenerative braking torque is determined and applied to the second left drive motor LM and the second right drive motor RM, electricity generated accordingly may be charged in the replaceable battery SB.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A connected driving control method of controlling connected driving of a first mobility device and a second mobility device the method comprising:

connecting communicatively the first mobility device and the second mobility device, wherein the first mobility device comprises a plurality of first wheels, at least one first drive motor providing a driving force to the plurality of first wheels, a first high-voltage battery supplying power to the at least one first drive motor, and a first pivot mechanism, and the second mobility device comprises a second left wheel, a second right wheel, at least one second drive motor providing a driving force to the second left wheel and the second right wheel, a second high-voltage battery supplying power to the at least one second drive motor, and a second pivot mechanism configured to be mechanically connected to the first pivot mechanism;

controlling the at least one second drive motor to provide the driving force to the second left wheel and the second right wheel to drive the second mobility device for travelling forward based on the first mobility device traveling forward, and to brake the second mobility device for decelerating in a regenerative braking mode;

determining to switch to the regenerative braking mode for the second mobility device based on a brake of the first mobility device being activated and the second mobility device being decelerated; and in the regenerative braking mode, applying a regenerative braking torque determined according to a deceleration state of the second mobility device to the at least one second drive motor.

2. The method of claim 1, wherein the first mobility device further comprises a first controller, at least one electric device that operates at a low voltage, a low-voltage battery that supplies power to the at least one electric device, a first direct current (DC) to DC (DC/DC) converter connected between the first high-voltage battery and the low-voltage battery, a second DC/DC converter connected to the first high-voltage battery, and a first connector connected to the second DC/DC converter, wherein the first controller is configured to control the second DC/DC converter according to a state of the first high-voltage battery and a state of the second high-voltage battery to charge the first high-voltage battery with the power of the second high-voltage battery, and wherein the second mobility device further comprises a third connector electrically and removably connected to the first connector and connected to the second high-voltage battery.

3. The method of claim 1, wherein determining whether to switch to the regenerative braking mode comprises:

receiving a brake signal of the first mobility device to perform the determining.

4. The connected driving control method of claim 3, wherein determining whether to switch to the regenerative braking mode further comprises:

receiving an acceleration sensor signal of the second mobility device to perform the determining.

5. The connected driving control method of claim 4, wherein determining whether to switch to the regenerative braking mode further comprises:

when it is determined that the first mobility device is in a braking state from the brake signal and the second mobility device is in the deceleration state from the acceleration sensor signal, determining to switch to the regenerative braking mode.

6. The connected driving control method of claim 1, wherein the deceleration state comprises a plurality of phases, and wherein the regenerative braking torque is determined according to each of the plurality of phases.

7. The connected driving control method of claim 6, wherein the plurality of phases is divided by a set deceleration rate.

8. The connected driving control method of claim 1, wherein the at least one second drive motor comprises:

a second left drive motor that provides a driving force to the second left wheel, and a second right drive motor that provides a driving force to the second right wheel.

9. An add-on mobility device, mechanically connected to and capable of traveling together with a front mobility device, the add-on mobility device comprising:

a frame comprising a second pivot mechanism mechanically connected to the first pivot mechanism;

a second left wheel mounted on a left side of the frame;

a second right wheel mounted on a right side of the frame;

at least one second drive motor configured to provide a driving force to the second left wheel and the second right wheel;

a second high-voltage battery configured to supply power to the second drive motor; and a second controller configured to control the second drive motor, wherein the second controller comprises a non-transitory storage medium storing a computer program for driving control for the add-on mobility device; and a processor configured to execute the computer program;

wherein the driving control for the add-on mobility device comprises:

connecting communicatively to the front mobility device, wherein the front mobility device comprises a plurality of first wheels, at least one first drive motor providing a driving force to the plurality of first wheels, a first high-voltage battery supplying power to the at least one first drive motor, a first controller controlling the first drive motor, and a first pivot mechanism;

controlling the at least one second drive motor to provide the driving force to the second left wheel and the second right wheel to drive the add-on mobility device for travelling forward based on the front mobility device traveling forward, and to brake the add-on mobility device for decelerating in a regenerative braking mode;

determining to switch to the regenerative braking mode for the add-on mobility device based on a brake of the first mobility device being activated and the second mobility device being decelerated; and in the regenerative braking mode, applying a regenerative braking torque determined according to a deceleration state of the add-on mobility device to the at least one second drive motor.

10. The add-on mobility device of claim 9, wherein the front mobility device further comprises at least one electric device that operates at a low voltage, a low-voltage battery that supplies power to the at least one electric device, a first direct current (DC) to DC (DC/DC) converter connected between the first high-voltage battery and the low-voltage battery, a second DC/DC converter connected to the first high-voltage battery, and a first connector connected to the second DC/DC converter, wherein the first controller is configured to control the second DC/DC converter according to a state of the first high-voltage battery and a state of the second high-voltage battery to charge the first high-voltage battery with the power of the second high-voltage battery, and wherein the add-on mobility device further comprises a third connector electrically and removably connected to the first connector and connected to the second high-voltage battery.

11. The add-on mobility device of claim 9, wherein determining whether to switch to the regenerative braking mode comprises:

receiving a brake signal of the front mobility device to perform the determining.

12. The add-on mobility device of claim 11, wherein determining whether to switch to the regenerative braking mode further comprises:

receiving an acceleration sensor signal of the add-on mobility device to perform the determining.

13. The add-on mobility device of claim 12, wherein determining whether to switch to the regenerative braking mode further comprises:

when it is determined that the front mobility device is in a braking state from the brake signal and the add-on mobility device is in the deceleration state from the acceleration sensor signal, determining to switch the regenerative braking mode.

14. The add-on mobility device of claim 9, wherein the deceleration state comprises a plurality of phases, and wherein the regenerative braking torque is determined according to each of the plurality of phases.

15. The add-on mobility device of claim 14, wherein the plurality of phases is divided by a set deceleration rate.

16. The add-on mobility device of claim 9, wherein the at least one second drive motor comprises:

a second left drive motor that provides a driving force to the second left wheel, and a second right drive motor that provides a driving force to the second right wheel.

* * * * *